United States Patent
Taylor et al.

(10) Patent No.: US 8,436,596 B2
(45) Date of Patent: May 7, 2013

(54) CURRENT DRIVING METHOD AND CIRCUIT FOR CONTROLLED DRIVING OF LIGHT-EMITTING DIODES

(75) Inventors: Craig Taylor, Lancashire (GB); Howard Mason, Lancashire (GB)

(73) Assignee: Zetex Semiconductors Plc (GB)

( * ) Notice: Subject to any disclaimer, the term of this patent is extended or adjusted under 35 U.S.C. 154(b) by 437 days.

(21) Appl. No.: 12/670,789

(22) PCT Filed: Jul. 16, 2008

(86) PCT No.: PCT/GB2008/002418
§ 371 (c)(1),
(2), (4) Date: Mar. 1, 2010

(87) PCT Pub. No.: WO2009/016344
PCT Pub. Date: Feb. 5, 2009

(65) Prior Publication Data
US 2010/0194368 A1 Aug. 5, 2010

(30) Foreign Application Priority Data

Jul. 28, 2007 (GB) .................................. 0714868.7

(51) Int. Cl.
G05F 1/00 (2006.01)
(52) U.S. Cl.
USPC .......................................... 323/274; 323/284
(58) Field of Classification Search .................. 323/269, 323/271, 274, 282, 284, 907
See application file for complete search history.

(56) References Cited

U.S. PATENT DOCUMENTS 7,015,654 B1 * 3/2006 Kuhlmann et al. ........... 315/291
(Continued)

FOREIGN PATENT DOCUMENTS

| JP | 2002-203988 A | 7/2002 |
| WO | 9720380 A1 | 6/1997 |

OTHER PUBLICATIONS

"British Search Report for International Application No. GB 0714868.7", Oct. 24, 2007, Publisher: UK Intellectual Property Office, Published in: UK.

*Primary Examiner* — Adolf Berhane
*Assistant Examiner* — Emily Pham
(74) *Attorney, Agent, or Firm* — Kaplan Breyer Schwarz & Ottesen, LLP

(57) ABSTRACT

A circuit comprises an inductor, a load, and a controllable switching device arranged in either a first configuration: switchable between the load being bypassed and the inductor energised, and current flowing through the load, and the inductor discharging energy into the load; or, a second configuration: switchable between current being permitted to flow through the load, inductor and controllable switching device in series, energising the inductor, and the current flowing through the load, and the inductor discharging energy into the load. The circuit further comprises control means for controlling the switching device, a load current sensing resistor connected in series with the load, and a demand signal input. Monitoring means is arranged to monitor the demand signal and the voltages across the sense resistors, and generate a monitor signal. The control means is arranged to receive the monitor signal and to switch the switching device in response the monitor signal exceeding a predetermined threshold.

27 Claims, 4 Drawing Sheets

U.S. PATENT DOCUMENTS

| | | |
|---|---|---|
| 7,528,587 B2 * | 5/2009 | Wu et al. .................. 323/282 |
| 2003/0034766 A1 | 2/2003 | Zafarana et al. |
| 2003/0111984 A1 | 6/2003 | Isham |
| 2004/0095105 A1 | 5/2004 | Nakata |
| 2005/0052169 A1 * | 3/2005 | Thrap ...................... 323/282 |
| 2005/0111469 A1 | 5/2005 | Howell |
| 2006/0050449 A1 | 3/2006 | Wu |
| 2006/0250121 A1 | 11/2006 | Tzeng et al. |

* cited by examiner

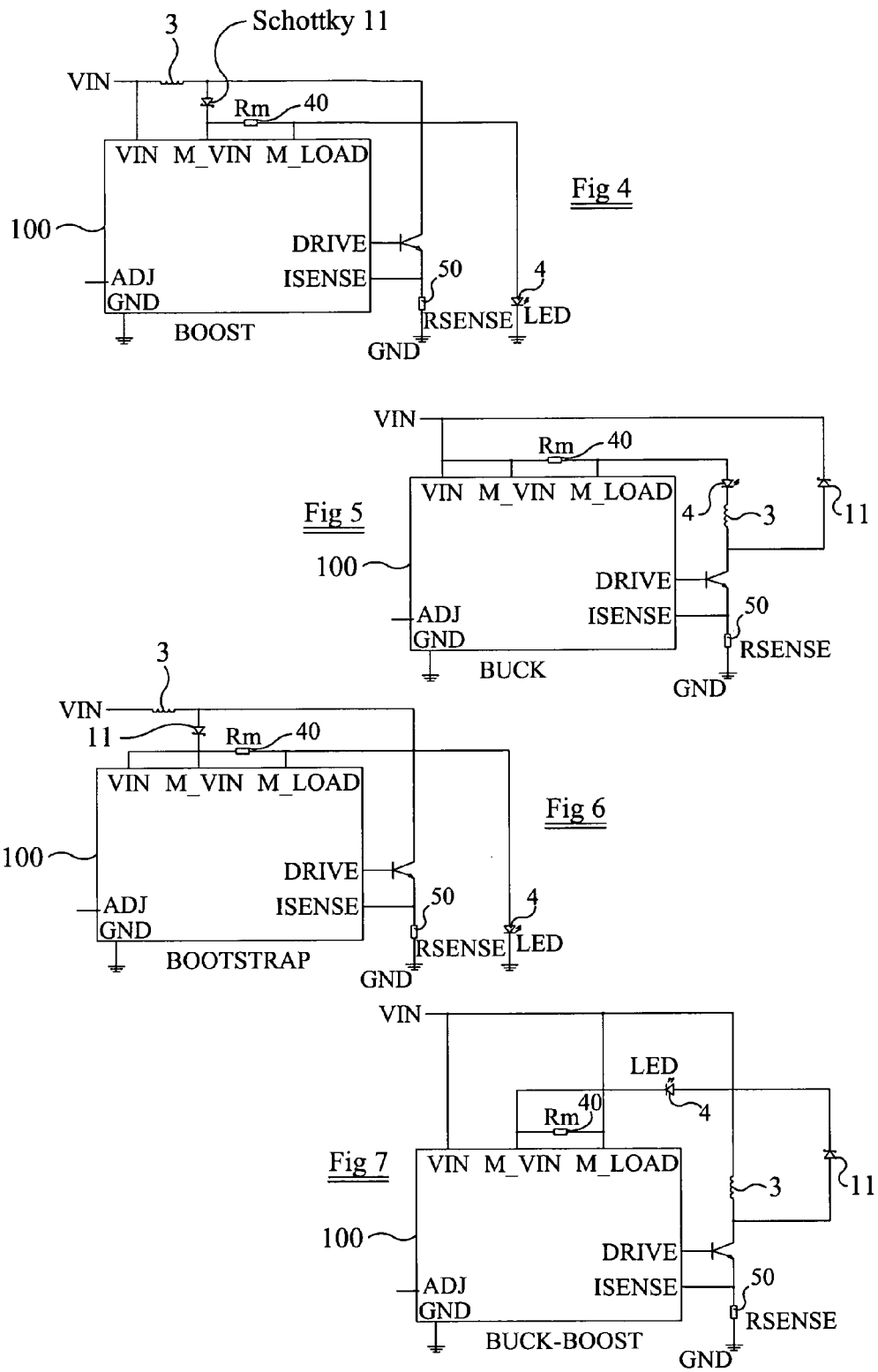

CURRENT DRIVING METHOD AND CIRCUIT FOR CONTROLLED DRIVING OF LIGHT-EMITTING DIODES

FIELD OF THE INVENTION

The present invention relates to methods of driving a current through a load, and to circuits in which a current is driven through a load. In particular, although not exclusively, embodiments of the invention relate to the controlled driving of LEDs.

BACKGROUND TO THE INVENTION

For a variety of applications there is a requirement for a drive circuit able to provide regulated drive of a load from some dc power supply. One such drive circuit in accordance with the prior art is shown in FIG. 1 and incorporates a Zetex Semiconductors plc. voltage mode boost converter ZXSC410. The circuit may, for example, be connected to a battery power supply and is able to provide a regulated output voltage Vout to drive an attached load. Applications of the circuit include the provision of system power for battery-operated portable products, the biasing of LCDs, and local voltage conversion. Further details of the converter device are shown in FIG. 2. Operation of the converter and drive circuit are as follows. The converter includes a temperature compensated bandgap reference circuit, connected to receive the supply voltage Vcc, and from which are derived all threshold voltages and internal currents. A dynamic drive circuit receives an input signal from a monostable circuit, and depending on that input signal the output of the dynamic drive is either "low" or "high". In the high state a current source drives the base of the external transistor Q1. The device includes a switching circuit comprising two comparators Comp1 and Comp2, a gate U1, a monostable and the drive output. Normally the drive output is "high" and the external switching transistor Q1 is turned on. Current then ramps up in the inductor L1, the switching transistor Q1, and the external current sensing resistor R1. The voltage (across sensing resistor R1) is sensed by comparator, Comp2, at input SENSE. Once this exceeds a predetermined threshold, comparator Comp2, through gate U1, triggers the re-triggerable monostable and turns off the output drive stage for a predetermined time (typically 2 microseconds). While the switching transistor is off, the inductor discharges to the load causing the output voltage VOUT to rise. After the predetermined time, if VOUT is below the nominal value, a new charge cycle begins, thus ramping up the output voltage. When the output voltage reaches the nominal value and the voltage feedback pin VFB receives an input voltage greater than a predetermined threshold, the monostable is forced "on" from Comp1 through gate U1. This stalls operation until the feedback voltage falls below the relevant threshold again. The above action then continues, to maintain regulation.

Thus, the above drive circuit can be described as operating in a skip mode (in other words, a stop-start mode), as the switching transistor is switched between off and on, being switched off according to fixed, predetermined threshold voltages, and remaining off for a fixed, predetermined time, before switching back on.

For various applications the above drive circuit provides excellent regulation, for example providing an output voltage that changes by less than 1% in response to a change in supply voltage over the full supply range from lithium-ion cells. The circuit may also be used to provide a regulated output from supplies in the range 1.65V to 8V.

However, a disadvantage with such known circuits operating in skip (start-stop) mode is that they can produce relatively large ripple, with the resultant emission of electromagnetic radiation, and furthermore the frequency of the skipping can be within the audio range, resulting in the coil core emitting an audible whistle, which in many applications (such as the driving of LEDs in a torch) is undesirable. The reason for the audible whistling is that the prior art has an output power which is fixed by outside parameters, such as supply voltage, peak inductor current, inductor value, etc. and the fixed 2 microseconds off time referred to above. If this power is excessive, the only way the device can control it is to stop working completely until the output voltage or current is within the desired range. The circuit will perform several cycles at an inaudibly high frequency, then stop for a period which can be quite long. This slow on and off cycling results in an audible whistle from the inductor.

SUMMARY OF THE INVENTION

It is an object of certain embodiments to provide load driving methods and circuits which obviate or mitigate at least one of the problems associated with the prior art. Certain embodiments aim to provide drive methods and circuits able to drive a regulated current through a load despite varying supply voltage, load temperature, and PCB temperature. Certain embodiments aim to provide LED drive methods and circuits. Certain embodiments aim to provide drive methods and circuits able to provide control of the magnitude of regulated load current. Certain embodiments aim to provide LED drive methods and circuits in which LED brightness can be adjusted (for example by adjusting LED current between 10% and 100% of a nominal maximum value). Certain embodiments aim to provide load driving methods and circuits able to monitor load temperature and provide protection to avoid thermal damage. Certain embodiments aim to provide load driving methods and circuits capable of working with wider supply ranges than the prior art, for example supply voltages from 1.2V to 18V (to work from a single cell up to an automotive supply voltage).

According to a first aspect of the present invention there is provided a circuit comprising:
- a first supply rail and a second supply rail for connection to a dc power supply;
- an inductor;
- a load; and
- a controllable switching device, switchable between a conducting state and a non-conducting state, and a switching device current sensing resistor connected in series with the controllable switching device such that a voltage across the switching device current sensing resistor is indicative of a current flowing through the switching device,
- the inductor, load and controllable switching device being arranged in one of two configurations, the two configurations comprising:
  - a first configuration in which, when the controllable switching device is in the conducting state, current is permitted to flow from the first supply rail to the second supply rail, through the inductor and controllable switching device, bypassing the load and energising the inductor, and when the controllable switching device is in the non-conducting state it blocks current flow through itself, current flows through the load, and the inductor discharges energy into the load; and
  - a second configuration in which, when the controllable switching device is in the conducting state, current is permitted to flow from the first supply rail to the second supply rail through the load, inductor and controllable switching device in series, energising the inductor, and when the controllable switching device is in the non-conducting state it blocks current flow through itself, current flows through the load, and the inductor discharges energy into the load, and wherein the circuit further comprises:

control means arranged to control the switching device to alternate between the conducting state and the non-conducting state, and characterised in that the circuit further comprises:

a load current sensing resistor connected in series with the load such that a voltage across the load current sensing resistor is indicative of a current flowing through the load;

a demand signal input for receiving a demand signal indicative of a desired current through the load; and monitoring means arranged to monitor the demand signal, and the voltages across the sense resistors, and generate a monitor signal having a magnitude dependent upon the demand signal, the voltage across the switching device current sensing resistor and the voltage across the load current sensing resistor, wherein the control means is arranged to receive the monitor signal and to switch the switching device from the conducting state to the non-conducting state in response to the magnitude of the monitor signal exceeding a predetermined threshold.

Thus, advantageously, rather than simply ramping up inductor current to the same peak value each "charging cycle" (when current is flowing through the inductor and switching device in series), as was the case in the prior art—where the peak value was that current for which the voltage across the switch device current sense resistor reached the predetermined threshold, the circuit according to the present invention is arranged such that the "switch-off" current (i.e. the peak charging current) is dependent upon the demand signal and the actual load current (monitored by the in-series load monitoring resistor) as well.

For example, in certain embodiments the monitoring means is arranged such that the magnitude of the monitor signal increases in response to increasing current through the switching device, and increases in response to load current exceeding the desired current. If actual load current is exceeding desired current, the monitor signal will therefore reach its predetermined "switch-off" triggering threshold at a lower switch current than would otherwise have been the case, hence the inductor is "charged" to a lower energy before the charging phase is ended.

It will be appreciated from the following description of embodiments that the "first configuration" defined in claim 1 corresponds to the arrangement of the load, inductor and switching device in any one of the BOOST, BOOTSTRAP, and BUCK-BOOST circuits. The "second" configuration corresponds to that of the BUCK circuit arrangement.

In certain embodiments the monitoring means comprises a first current generator arranged to generate a demand current having a magnitude dependent upon the demand signal, the monitor signal magnitude being dependent upon the demand current.

The demand signal may be a voltage signal, and the first current generator may be a first voltage-to-current converter arranged to generate the demand current with a magnitude dependent upon (e.g. proportional to) the magnitude of the demand signal voltage.

In certain embodiments the monitoring means comprises a second voltage-to-current converter arranged to generate a load monitoring current having a magnitude dependent upon (e.g. proportional to) the voltage across the load current sensing resistor, the monitor signal magnitude being dependent upon the load monitoring current.

In certain embodiments the monitoring means comprises integrating means arranged to generate a voltage dependent upon an integrated difference between the demand current and the load monitoring current.

Advantageously, this generated voltage can then be used to determine the charge-phase end current (in other words the voltage can be used to generate the monitor signal). For example, if the actual load current exceeds the desired current, the generated voltage can be used to reduce the current to which the inductor is "charged", rather than charging to the same peak current each time as in the prior art.

Advantageously, the monitoring means may comprise a capacitor arranged to be charged by the load monitoring current and discharged by the demand current, the magnitude of the monitor signal being dependent upon the voltage across the capacitor. Thus, a single capacitor may be used to provide the integrating function, and the voltage on that capacitor used to determine inductor charging level. Load current exceeding demand current results in increasing capacitor voltage, which can then be used to reduce the current at which the charge phase is terminated. Equivalently, if demand current is exceeding actual load current, this can result in a reduction in capacitor voltage, which in turn can be used to increase the current to which the inductor is excited in the charge phase.

In certain embodiments the monitoring means comprises summing means arranged to generate the monitor signal according to the magnitudes of the voltage across the switching device current sensing resistor and the voltage across the capacitor. The summing means may be arranged such that the magnitude of the monitor signal increases with increasing voltage across the switching device current sensing resistor and with increasing capacitor voltage over at least a range of those voltages.

Thus, as the switching device is switched off when the monitoring signal reaches the predetermined threshold, increased capacitor voltage reduces the switch current at which this takes place, and vice versa.

In certain embodiments the circuit further comprises temperature sensing means arranged to sense a temperature of the load and generate a temperature signal indicative of the temperature of the load, the monitoring means being arranged to monitor the temperature signal and to generate the monitor signal such that the monitor signal magnitude is dependent upon the temperature signal. For example, the temperature sensing means may be arranged to generate the temperature signal only when the temperature of the load rises above a predetermined upper temperature threshold, and the magnitude of the temperature signal may, for example, be proportional to the amount by which the temperature exceeds that threshold. In other embodiments, the magnitude of the temperature signal may be a different function of temperature, however.

In certain embodiments the temperature signal is a voltage signal and the monitoring means comprises a third voltage-to-current converter arranged to generate a temperature monitoring current having a magnitude dependent upon (e.g. proportional to) the magnitude of the temperature signal, the monitor signal magnitude being dependent upon the temperature monitoring current.

The temperature monitoring current may then be arranged to charge the same capacitor used to integrate the difference between the load and demand currents. Advantageously, this results in inductor peak current being reduced as load temperature increases (e.g. above a predetermined upper temperature threshold), thereby providing protection from thermal damage. In other words, the temperature signal is used to reduce inductor-charging current to provide protection.

In certain embodiments the temperature monitoring current and the load monitoring current are sourcing currents, and the demand current is a sinking current.

In certain embodiments the control means is arranged to switch the switching device back to the conducting state a delay time after switching the switching device to the non-conducting state in response to the monitor signal. This can be achieved, for example, by the circuit comprising a timer arranged to trigger switch-back to conduction after the delay time has elapsed.

In certain embodiments the control means is arranged to determine the delay time according to the demand signal. This is in contrast to prior art arrangements in which the "off" time was fixed, and provides the advantage that off time can be lengthened in response to reduced demand, so enabling "off" times to be longer than would otherwise be the case. The increased "off" time, together with the continuously variable peak coil current, enable the device to have a wide power output range and thus operate continuously at the extremes of the power settings In turn, this enables switching frequencies to be kept out of the audible range, to avoid whistling.

Thus, in certain embodiments the demand signal is a voltage signal having a magnitude indicative of the desired current, and the control means is arranged to increase the delay time in response to a decrease in the demand signal magnitude. Conveniently, this can be achieved by arranging the demand signal to drive a monostable circuit, a smaller demand signal taking longer to charge the monostable timing capacitor to the required switching voltage.

In certain embodiments the first supply rail is a positive supply rail for connecting to a positive terminal of a dc supply, the second supply rail is a ground rail, and the load current sensing resistor is arranged on the high side of the load, between the load and the positive supply rail. It will be appreciated from the following detailed description of certain embodiments that the load current sensing resistor is on the high side of the load for all embodiments except the Buck-Boost mode circuit.

In such embodiments, the switching device current sensing resistor may then be arranged on the low side of the switching device, between the switching device and the ground rail. It will be appreciated from the following detailed description that the switching device current sensing resistor is on the low side of the switching device in each of the Boost, Buck, Bootstrap and Buck-Boost mode circuits.

With the load current sensing resistor on the high side, it can thus provide a means of monitoring current flow into the load, for example in the case where the load is a battery being charged from the dc supply.

Another aspect of the invention provides a method of driving a current through a load, the method comprising:
  providing a first supply rail and a second supply rail and a dc power supply connected between the first and second rails;
  providing an inductor;
  providing a load;
  providing a controllable switching device, switchable between a conducting state and a non-conducting state, and a switching device current sensing resistor connected in series with the controllable switching device such that a voltage across the switching device current sensing resistor is indicative of a current flowing through the switching device;
  arranging the inductor, load and controllable switching device in one of two configurations, the two configurations comprising:
  a first configuration in which, when the controllable switching device is in the conducting state, current is permitted to flow from the first supply rail to the second supply rail, through the inductor and controllable switching device, bypassing the load and energising the inductor, and when the controllable switching device is in the non-conducting state it blocks current flow through itself, current flows through the load, and the inductor discharges energy into the load; and
  a second configuration in which, when the controllable switching device is in the conducting state, current is permitted to flow from the first supply rail to the second supply rail through the load, inductor and controllable switching device in series, energising the inductor, and when the controllable switching device is in the non-conducting state it blocks current flow through itself, current flows through the load, and the inductor discharges energy into the load; and
  controlling the switching device to alternate between the conducting state and the non-conducting state;
  characterised in that the method further comprises:
  providing a load current sensing resistor and connecting the load current sensing resistor in series with the load such that a voltage across the load current sensing resistor is indicative of a current flowing through the load;
  providing a demand signal indicative of a desired current through the load;
  monitoring the demand signal, and the voltages across the sense resistors; and
  using the demand signal, the voltage across the switching device current sensing resistor and the voltage across the load current sensing resistor to determine when to switch the switching device from the conducting to the non-conducting state.

In certain embodiments the method further comprises using the demand signal to determine a delay time interval between switching the switching device from the conducting state to the non-conducting state and switching the switching device back from the non-conducting state to the conducting state.

Certain embodiments further comprise monitoring a temperature of the load, generating a temperature signal indicative of the load temperature, and using the temperature signal in addition to the demand signal, the voltage across the switching device current sensing resistor and the voltage across the load current sensing resistor to determine when to switch the switching device from the conducting to the non-conducting state.

Certain embodiments further comprise generating a demand current having a magnitude dependent upon the demand signal, generating a load monitoring current having a magnitude dependent upon (e.g. proportional to) the voltage across the load current sensing resistor, arranging a capacitor to be charged by the load monitoring current and discharged by the demand current, and using the voltage across the capacitor to determine when to switch the switching device from the conducting to the non-conducting state.

Certain embodiments further comprise generating a temperature monitoring current having a magnitude dependent upon the temperature signal, and arranging the capacitor to be charged by the temperature monitoring signal in addition to the load monitoring signal.

In certain embodiments the monitoring signal Vmon is generated by summing means such that its magnitude is dependent upon the magnitudes of the voltage across the switching device current sensing resistor and the voltage across the capacitor (e.g. the summing means may be arranged such that the magnitude of the monitor signal increases with increasing voltage across the switching device current sensing resistor and with increasing capacitor voltage over at least a range of those voltages) and the method further comprises switching the switching device from the conducting to the non-conducting state when the magnitude of Vmon reaches a predetermined threshold.

Another aspect of the invention provides a method of driving a current through a load, the method comprising:

providing a first supply rail and a second supply rail and a dc power supply connected between the first and second rails;

providing an inductor;

providing a load;

providing a controllable switching device, switchable between a conducting state and a non-conducting state, and a switching device current sensing resistor connected in series with the controllable switching device such that a voltage across the switching device current sensing resistor is indicative of a current flowing through the switching device;

arranging the inductor, load and controllable switching device in one of two configurations, the two configurations comprising:

a first configuration in which, when the controllable switching device is in the conducting state, current is permitted to flow from the first supply rail to the second supply rail, through the inductor and controllable switching device, bypassing the load and energising the inductor, and when the controllable switching device is in the non-conducting state it blocks current flow through itself, current flows through the load, and the inductor discharges energy into the load; and a second configuration in which, when the controllable switching device is in the conducting state, current is permitted to flow from the first supply rail to the second supply rail through the load, inductor and controllable switching device in series, energising the inductor, and when the controllable switching device is in the non-conducting state it blocks current flow through itself, current flows through the load, and the inductor discharges energy into the load; and controlling the switching device to alternate between the conducting state and the non-conducting state, characterised in that the method further comprises:

providing a demand signal indicative of a desired current through the load; and using the demand signal to determine a length of time between switching the switching device from the conducting state to the non-conducting state and switching the switching device back from the non-conducting state to the conducting state.

Again, this provides the advantage that delay time can be altered according to demand signal (e.g. lengthened in response to reduced demand) which, in conjunction with the continuously variable peak coil current, keeps switching frequencies out of the audible range and so avoids whistling.

The method may also comprise providing a load current sensing resistor and connecting the load current sensing resistor in series with the load such that a voltage across the load current sensing resistor is indicative of a current flowing through the load, and then using the demand signal and the voltages across both sense resistors to determine when (i.e. at what switch current) to switch the switching device "off" (to the non-conducting state) to terminate the charging phase.

Another aspect of the invention provides a corresponding circuit.

Certain embodiments of the present invention provide a circuit comprising:

a first supply rail and a second supply rail for connection to a dc power supply;

an inductor having a first inductor terminal, connected to the first supply rail, and a second inductor terminal;

a load connected in series between the second inductor terminal and the second supply rail;

a controllable switching device and a switching device current sensing resistor connected in series between the second inductor terminal and the second supply rail, such that a voltage across the switching device current sensing resistor is indicative of a current flowing through the switching device;

control means arranged to control the switching device to alternate between a conducting state in which the switching device permits current to flow between the first and second supply rails, through the inductor and itself and the switching device current sensing resistor, and a non-conducting state in which the switching device blocks current flow between the first and second rails through itself, whereby when the switching device is in the conducting state the circuit is in a charging phase in which a connected dc supply is able to drive increasing current through the inductor, energising the inductor, and when the switching device is in the non-conducting state the circuit is in a discharging phase in which inductor current is diverted to flow through the load, the inductor discharging energy into the load, characterised in that the circuit further comprises:

a load current sensing resistor connected in series with the load, between the second inductor terminal and the second supply rail, such that a voltage across the load current sensing resistor is indicative of a current flowing through the load a demand signal input for receiving a demand signal indicative of a desired current through the load; and monitoring means arranged to monitor the demand signal, and the voltages across the sense resistors, and generate a monitor signal having a magnitude dependent upon the demand signal, the voltage across the switching device current sensing resistor and the voltage across the load current sensing resistor, wherein the control means is arranged to receive the monitor signal and to switch the switching device from the conducting state to the non-conducting state in response to the magnitude of the monitor signal exceeding a predetermined threshold.

These are examples in which the inductor, load and switching device are in the first configuration.

Certain embodiments of the invention provide a method of driving a current through a load, the method comprising:

providing a first supply rail and a second supply rail and a dc power supply connected between the first and second rails;

providing an inductor having a first inductor terminal, connected to the first supply rail, and a second inductor terminal;

providing a load and connecting the load in series between the second inductor terminal and the second supply rail;

providing a controllable switching device and a switching device current sensing resistor connected in series between the second inductor terminal and the second supply rail, such that a voltage across the switching device current sensing resistor is indicative of a current flowing through the switching device;

controlling the switching device to alternate between a conducting state in which the switching device permits current to flow between the first and second supply rails, through the inductor and itself and the switching device current sensing resistor, and a non-conducting state in which the switching device blocks current flow between the first and second rails through itself, whereby when the switching device is in the conducting state the dc supply drives increasing current through the inductor, energising the inductor, and when the switching device is in the non-conducting state inductor current is diverted to flow through the load and the inductor discharges energy into the load, characterised in that the method further comprises:

providing a load current sensing resistor and connecting the load current sensing resistor in series with the load, between the second inductor terminal and the second supply rail, such that a voltage across the load current sensing resistor is indicative of a current flowing through the load;

providing a demand signal indicative of a desired current through the load;

monitoring the demand signal, and the voltages across the sense resistors; and using the demand signal, the voltage across the switching device current sensing resistor and the voltage across the load current sensing resistor to determine when to switch the switching device from the conducting to the non-conducting state.

Certain embodiments of the invention provide a method of driving a current through a load, the method comprising:

providing a first supply rail and a second supply rail and a dc power supply connected between the first and second rails;

providing an inductor having a first inductor terminal, connected to the first supply rail, and a second inductor terminal;

providing a load and connecting the load in series between the second inductor terminal and the second supply rail;

providing a controllable switching device and a switching device current sensing resistor connected in series between the second inductor terminal and the second supply rail, such that a voltage across the switching device current sensing resistor is indicative of a current flowing through the switching device;

controlling the switching device to alternate between a conducting state in which the switching device permits current to flow between the first and second supply rails, through the inductor and itself and the switching device current sensing resistor, and a non-conducting state in which the switching device blocks current flow between the first and second rails through itself, whereby when the switching device is in the conducting state the dc supply drives increasing current through the inductor, energising the inductor, and when the switching device is in the non-conducting state inductor current is diverted to flow through the load and the inductor discharges energy into the load, characterised in that the method further comprises:

providing a demand signal indicative of a desired current through the load; and using the demand signal to determine a length of time between switching the switching device from the conducting state to the non-conducting state and switching the switching device back from the non-conducting state to the conducting state.

It will be appreciated that certain embodiments of the invention provide a solution to the problem of audible whistling from the inductor in the prior art, by controlling the peak coil current over a large range and controlling the off time over a defined range, such that it runs continuously and inaudibly over the entire range of supply voltage and power demand.

Another aspect of the invention provides a semiconductor chip package for incorporation in a circuit in accordance with any one of the above aspects, the semiconductor chip package comprising: the control means; the monitoring means; pins for connection to the supply rails; pins for receiving a differential voltage signal from across the load current sensing resistor; a pin for connection to an external integrating capacitor; a pin for receiving a voltage signal from a high side of the switching device current sensing resistor; and a pin for receiving the demand signal. The package may include the controllable switching device, but in alternative embodiments the controllable switching device is an external component, with the package comprising a pin for connection to the controllable switching device to provide the controlling signal (i.e. a drive signal). The package may comprise one or more further pins, as shown in the figures and described below. The package may be incorporated in Boost, Buck, Bootstrap or Buck-Boost mode circuits.

In certain embodiments the load comprises a light-emitting diode (LED), although in other embodiments the load may, for example, be a battery (to be charged by the load current), a solenoid, a resistor, a bulb, a heating element, or some other load.

BRIEF DESCRIPTION OF THE DRAWINGS

Embodiments of the invention will now be described with reference to the accompanying drawings, of which:

FIGS. 4 to 7 are diagrams illustrating different circuits embodying the invention in which the semiconductor chip package is arranged in different configurations with respect to the load, inductor and switching device to provide different modes of operation.

DETAILED DESCRIPTION OF EMBODIMENTS OF THE INVENTION

Figure 1:
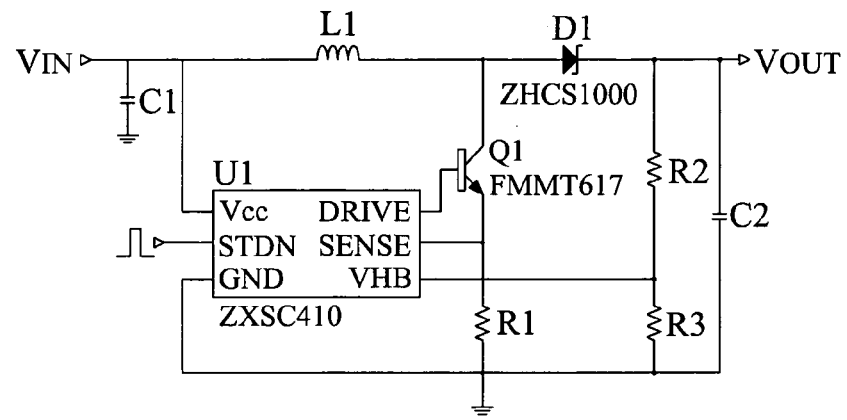
FIG. 1 is a diagram of a drive circuit known in the art.
Figure 2:
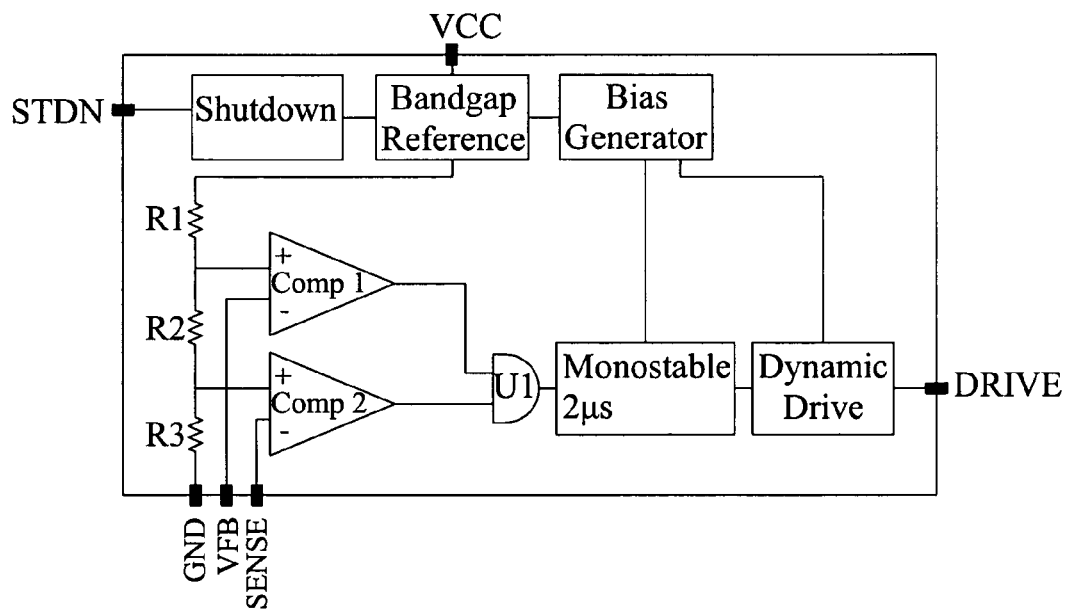
FIG. 2 is a diagram of components of the known converter device ZXSC410 in the circuit of FIG. 1.
Figure 3:
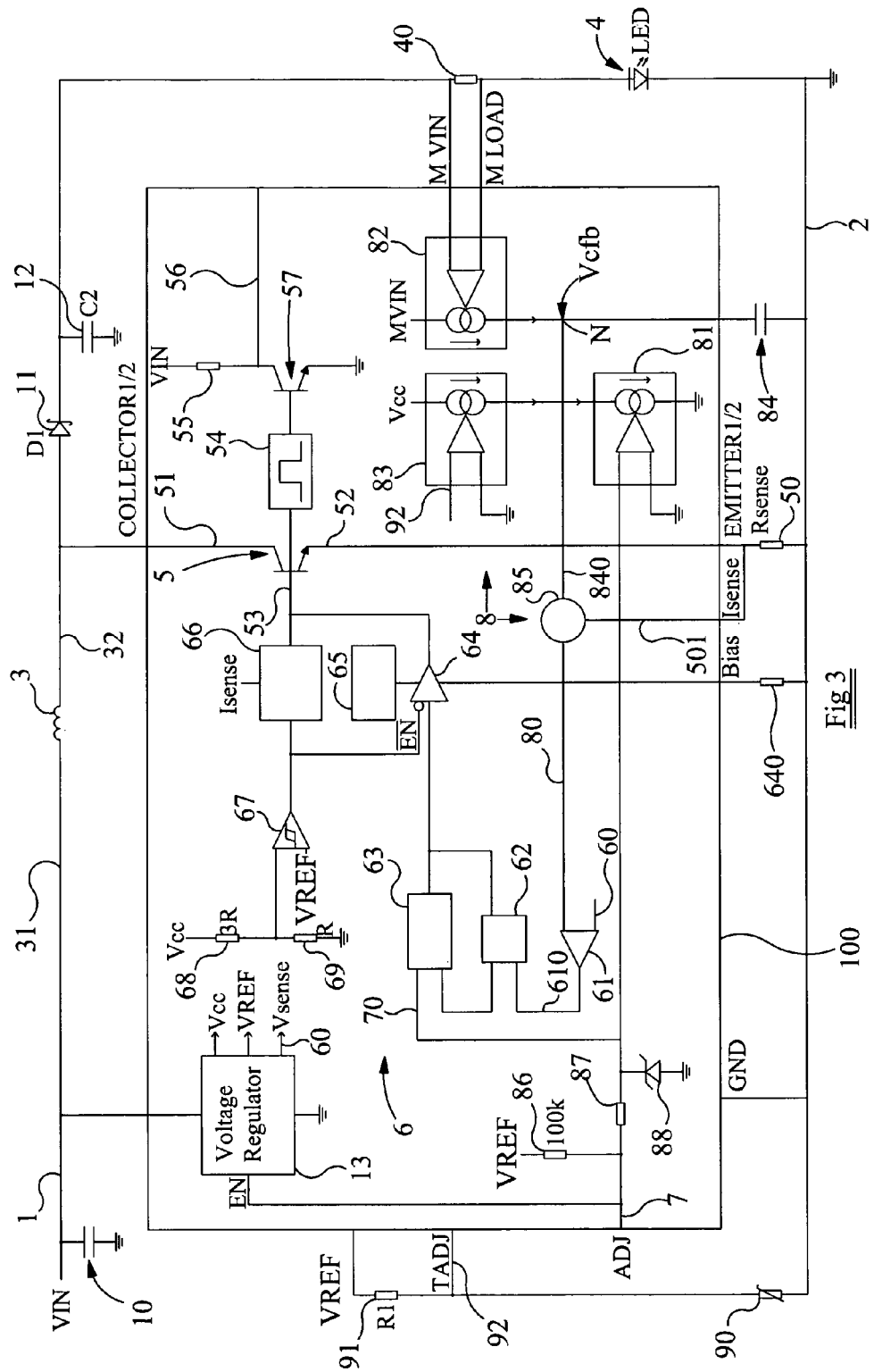
FIG. 3 is a diagram of a circuit embodying the present invention and incorporating a semiconductor chip package embodying the invention.

Referring now to FIG. 3, this shows a circuit embodying the invention, which can also be described as a drive circuit embodying the invention, arranged to drive a load 4. The circuit comprises a first supply rail 1 and a second supply rail 2 for connection to a dc power supply, providing a supply voltage Vin. An input capacitor 10 is connected between the supply voltage input and ground. An inductor 3 (L1) has a first inductor terminal 31 connected to the first supply rail 1, and has a second inductor terminal 32. A load 4 is connected in series with load current monitor resistor 40 (RM) between the second inductor terminal 32 and the second supply rail 2. In series with the load 4 is a diode 11, and an output capacitor 12 is connected in parallel with the load and RM, between the diode 11 and ground. In this embodiment the load 4 is a 3 W LED. The circuit also comprises a controllable switching device, in the form of a bipolar transistor 5, and a switching device current sensing resistor 50 connected in series between the second inductor terminal 32 and the second supply rail 2, such that a voltage 501 measured between ISENSE and supply rail 2 across the switching device current sensing resistor is indicative of a current flowing through the switching device. The series-connected switching device 5 and sense resistor 50 are together connected in parallel with the series combination of diode 11, current monitoring resistor 40 and load 4. The circuit also comprises control means 6 arranged to control the switching device 5 (with control signal 53) to alternate between a conducting state in which the switching device permits current to flow between the first and second supply rails, through the inductor 3 and itself 5 (from its collector 51 to its emitter 52) and the switching device current sensing resistor 50, and a non-conducting state in which the switching device blocks current flow between the first and second rails through itself. Thus, when the switching device 5 is in the conducting state the circuit is in a charging phase in which a connected dc supply is able to drive increasing current through the inductor 3, energising the inductor, and when the switching device is in the non-conducting state the circuit is in a discharging phase in which inductor current is diverted to flow through the load 4, the inductor discharging energy into the load.

The circuit further comprises a load current sensing resistor 40 connected in series with the load 4, between the second inductor terminal 32 and the second supply rail 2, such that a voltage MVIN-MLOAD across the load current sensing resistor is indicative of a current flowing through the load. Also, the circuit comprises a demand signal input 7 for receiving a demand signal ADJ indicative of a desired current through the load.

The circuit also comprises monitoring means 8 arranged to monitor the demand signal 7, and the voltages across the sense resistors 40,50, and generate a monitor signal 80 having a magnitude dependent upon the demand signal, the voltage across the switching device current sensing resistor and the voltage across the load current sensing resistor. The control means 6 is arranged to receive the monitor signal 80 and to switch the switching device 5 from the conducting state to the non-conducting state in response to the magnitude of the monitor signal exceeding a predetermined threshold 60 (Vsense).

The circuit also comprises temperature sensing means including a thermistor 90 arranged to have a resistance Rth dependent upon the temperature of the load 4. The thermistor 90 is connected in series with another resistor 91 of the temperature sensing means, between reference voltage VREF and ground to provide a temperature signal 92 (TADJ) indicative of load temperature.

The circuit includes a voltage regulator 13 connected between the first and second supply rails (i.e. between the first rail 1 and ground) and arranged to generate reference voltages Vcc, VREF and Vsense (i.e. the threshold voltage 60) for the rest of the circuit. The control means includes an under-voltage comparator 67, having its non-inverting input connected to receive reference voltage VREF, and its inverting input receiving a voltage from a potential divider arrangement of resistors 68 and 69 connected in series between Vcc and ground. The purpose of the under voltage comparator is as follows. The output drive circuit has a minimum input voltage at which it will achieve the full specification, but it was desirable to make the circuit continue to operate with reduced performance at lower input voltages. The under voltage comparator produces a signal which switches in a different output driver that can achieve this reduced drive at input voltages below 2V. Furthermore, extremely low temperature limits the minimum operating voltage to a higher value, so the under voltage threshold has a negative temperature coefficient as well, which switches in the lower voltage circuit at a higher input voltage as the temperature reduces.

The control means 6 also comprises a start-up oscillator and driver 66 arranged to receive the signal ISENSE from the sense resistor 50. The start-up oscillator drives the power transistor, with reduced base current at a fixed frequency of approximately 50 kHz and a mark:space ratio of 1:1. This might not achieve the full performance, but will enable operation down to a much lower input voltage. Because it is possible for the current to exceed a safe value during the ON time, the signal on the RSENSE resistor 50 is monitored and the power transistor turned off if the current is excessive.

An over-temperature shutdown circuit 65 is arranged to respond to excessive circuit temperature (i.e. Chip temperature) by causing the driver stage 64, (which provides the control signal 53 to the switching device), to switch the switching device 5 off. Thus, if the circuit becomes too hot, charging of the inductor L is ceased because the output drive is inhibited if the chip temperature exceeds +150° C.

The drive signal 53 is also used to drive a 500 microsecond monostable circuit 54, which in turn drives a second switching device 57 to generate an output signal 56 (POK). If the power transistor has been turned on for 500 μs and the current has still not reached the value expected by the SENSE comparator 61 [note to inventors: is this correct?], the POK pin goes low. This is a warning that there is either insufficient input voltage to reach the correct current or that a physical fault has occurred, such as an open circuit coil. If the main LED is remote, a second LED can be connected to the POK pin to warn the user of the fault condition.

In this first example the monitoring means comprises a bandgap reference voltage VREF from voltage regulator 13, an arrangement of resistors 86, 87 and over-voltage clamp diode 88 providing a voltage signal 70 (VADJ) dependent upon the demand signal (ADJ) provided to the demand input 7, and a first voltage-to-current converter 81 arranged to receive the voltage signal 70 and generate a demand, or reference, current IADJ having a magnitude dependent upon the demand signal. The monitoring means also comprises a second voltage-to-current converter 82 arranged to generate a load monitoring current IMON having a magnitude proportional to the voltage across the monitoring or sense resistor 40 (RM), and a third voltage-to-current converter 83 arranged to generate a temperature monitoring current (a thermal compensation current) ITC having a magnitude dependent upon the temperature signal 92. The monitoring means also comprises integrating means in the form of a capacitor 84 (CFB). The thermal compensation current ITC and load monitoring current IMON are both arranged to charge the capacitor 84, while the demand current IADJ is arranged to discharge the capacitor. The voltage VCFB across the capacitor thus depends on the balance of these currents. If load current exceeds demand, this will tend to increase capacitor voltage and this increased voltage can be used to reduce the current to which the inductor 3 is charged during the charge phase. The capacitor voltage VCFB and the voltage 501 measured at ISENSE are supplied to summing means 85 of the monitoring means 8, the summing means 85 generating monitor signal 80 from the supplied voltages. The summing means is arranged such that increased capacitor voltage reduces the switch current at which charging is terminated, and vice versa.

Figure 8:
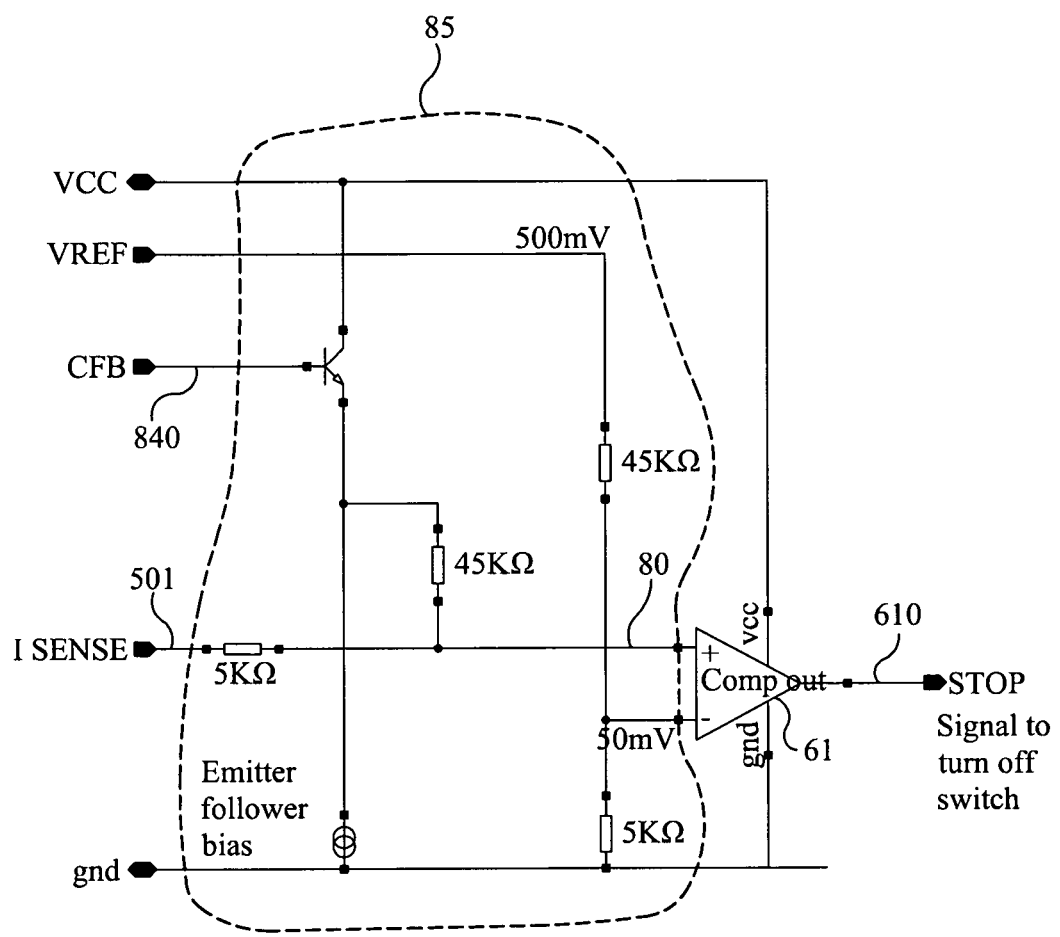
FIG. 8 is a diagram illustrating a summing circuit which may be used in embodiments of the invention.

Summing means (which may also be referred to as a summing circuit) suitable for use in the embodiment illustrated in FIG. 3, and indeed for use in the other embodiments described below, is shown in FIG. 8, and will be described later.

Returning to FIG. 3, the control means comprises comparator 61 for comparing monitor signal 80 with threshold voltage 60 (Vsense), a latch circuit 62 (of the SRQ type) arranged to be reset by the comparator 61 output 610, and a variable "off" delay monostable circuit 63 arranged to set the latch 62 after a time delay determined by voltage signal 70. The smaller the signal 70, the longer the monostable takes to set the latch, hence the longer it takes before the switching device is switched back to the on state, to begin another charge phase.

Operation of the circuit of FIG. 3 will now be described in further detail.

The circuit of FIG. 3 contains a Highside Current Monitor 82, a device which takes the differential voltage across an external sense resistor 40 and generates an internal current IMON which is proportional to this voltage. This current is a sourcing current, which means positive current comes from the highside rail 1. This external sense resistor 40 is in series with the LED 4 which the circuit drives, so the internal current IMON is proportional to the LED current. A pin on the device, called the ADJ pin (i.e. the demand input 7), is set by the user at a voltage between zero and a defined maximum voltage. This voltage is used to program the current in the LED at a level proportional to the ADJ pin voltage.

If the ADJ pin is at 10% of the maximum, the LED current will be at 10% of the programmed value. If the ADJ pin is at 100% of the maximum, the LED current will be at 100% of the programmed value. The way it does this is through a voltage to current converter 81, similar to the highside monitor, but it generates a sinking current IADJ proportional to the voltage on the ADJ pin.

It will be appreciated that FIG. 3 is a simplified block diagram, including the circuit blocks which enable its operation to be understood. The resistor RM 40 in series with the LED 4 is the one producing a voltage proportional to LED current and this voltage is applied differentially between pins M_VIN and M_LOAD. In the figure, reference numeral 100 represents the extent of the current driving device of the circuit, with components outside boundary 100 being external components. As such, the device within boundary 100 is a device embodying the invention. Pins enabling the device 100 to be connected to external components are labeled on the figure (e.g. BIAS, VIN, VREF, ADJ etc). The LED Current Monitor, which is a Voltage to Current Converter 82, can be seen across these pins MVIN, MLOAD driving the proportional current into the CFB node N, with the external stabilising capacitor 84 to ground. The ADJ pin can be seen driving another Voltage to Current Converter 81 producing the Reference Current IADJ. The CFB node N is driving the summing junction 85, showed with the "+" sign, whose other input is the voltage 501 from the Power Transistor 5 emitter sense resistor 50. A correctly-ratioed sum of these two signals provides the monitor signal 80 which goes to the Comparator 61 which resets the latch (when the monitor signal reaches the predetermined threshold 60, which in this example is 50 mV), turning the power transistor 5 OFF. The ADJ pin 7 can also be seen driving the Variable OFF Delay Monostable 63, which sets the latch 62 after the programmed OFF time, turning the power transistor back on. A Low Voltage Comparator 67 enables the circuit to have a special start-up mode and there is a regulator circuit 13 providing various references for the circuit. Finally, an external Thermistor 90 and series resistor 91 can be seen driving the TADJ pin, which drives another Voltage to Current Converter 83, which sums an extra current ITC into the CFB node N at temperatures exceeding a predetermined threshold to reduce the power in the LED when it gets too hot. A more detailed description of the operation now follows.

The proportionality of the two currents from the Voltage to Current Converters 81, 82 connected to the LED sense resistor 40 and the ADJ pin 7 is such that they are equal when ADJ is set to the maximum and the LED current sense resistor drops a defined voltage. These currents are summed into an external capacitor 84. If the ADJ pin is at the maximum and the current in the LED is less than 100% of the programmed maximum, the currents in the LED Current Monitor will be less than that from the ADJ pin circuit and the voltage Vcfb on the capacitor will fall. If the LED current exceeds the programmed maximum, the LED Current Monitor will provide more current than the ADJ pin circuit and the voltage on the capacitor will rise. This voltage is used to control the peak current in the inductor. The capacitor provides loop compensation in addition to acting as an integrator.

To switch the inductor L, there is a power transistor 5 within the chip 100 in this example (but in alternative embodiments the power transistor, i.e. controllable switching device, is an external component, outside the chip or chip package 100). When this is turned on the inductor current will ramp up, at a rate determined by the supply voltage Vin and the inductor value. Another sense resistor 50, this time in the emitter of the power transistor, detects when the current reaches a value that causes a defined voltage to be dropped in the resistor. This resistor is external and can be chosen by the user. At the defined voltage the power transistor is switched off and the inductor current diverts into the LED circuit. The transistor is OFF for a time determined by an on-chip timer. However, the turn-off threshold is not always the defined voltage—and can be reduced by the voltage on the stabilising capacitor 84 referred to earlier. If the CFB voltage is higher, the threshold value of voltage across the sense resistor 50 is lower, so the power transistor turns off earlier and at a lower inductor peak current. The energy stored in the inductor is now less and the average current in the LED is reduced. In this way the control loop will increase or decrease the inductor energy to maintain the programmed LED current.

If the user wishes to reduce the LED power by adjusting the ADJ pin voltage, the circuit will reduce the coil current appropriately. If the off time were fixed, the only way the circuit could reduce coil current would be to turn off the power transistor earlier. This could result in extremely short ON times, which could get close to the switching speed of the transistor and introduce switching losses and thus reduce efficiency. However, a feature of the circuit design in FIG. 3 is the variable OFF time of the power transistor. At a given power setting (i.e. for a given demand signal at demand input 7), the off time is fixed by the on-chip timer 63 referred to earlier. However, if the ADJ pin is reduced in voltage, this timer gives a longer OFF time. This results in less average power, so the ON time does not need to reduce in proportion to the power setting and can remain at a reasonable value, below the maximum switching speed of the circuits.

The Voltage to Current Converter 83 driven from the TADJ pin produces no current until the LED reaches a temperature which is pre-determined by the choice of thermistor 90 and series resistor 91. Above this temperature, it produces a linearly increasing current ITC, which reaches the maximum system current at another higher temperature. As the currents at the CFB node N all need to sum to zero to maintain constant voltage and the Reference Current IADJ from ADJ is fixed, more current from the TADJ circuit 83 will require less current from the LED Current Monitor 81 to maintain the operating point. In this way, the power is reduced linearly from 100% at the lower temperature to zero at the upper temperature, protecting the LED from thermal damage.

The circuit of FIG. 3 comprises a Schottky diode 11 connected in series with the load and load current sensing resistor. In alternative embodiments it will be appreciated that an alternative diode may be used, or the diode may be replaced by some other device providing conduction for only half a cycle, such as a rectifier or synchronous switch (driven for example by a control signal 180 degrees out of phase with the drive for the power transistor 5).

Finally, for extremely low voltages, a start-up mode is provided by the chip 100. This mode uses an oscillator 66 which drives the power transistor 5 on and off, whether it reaches the preset peak current or not. The control loop (to stabilize load current) does not work at this low voltage. This generates a reduced power in the converter, which will light the LED at lower brightness and will generate a voltage higher than supply voltage, which can be used to power the VIN pin of the chip so that it works correctly at full power and with the control loop fully operational. This is called the "Bootstrap" mode. In case the coil current gets excessive, which can still happen at low voltage, a lower current sense threshold is used to stop the drive to the power transistor.

Four different circuits embodying the invention, with different modes of operation, are shown in FIGS. 4 to 7. These each incorporate the same chip or chip package 100 utilised in the embodiment of FIG. 3. It will be appreciated that the diagrams are simplified, e.g. there are no decoupling or reservoir capacitors shown, but enable the different modes of operation to be understood FIG. 5 shows a circuit operating in so-called "BUCK" mode, where VIN is more than the LED voltage and so needs to be stepped down. In other words, the chip 100 is connected in this configuration for applications in which VIN is greater than the load voltage. The coil 3 and LED 4 are connected in series across VIN via a transistor and the current ramps up until it reaches a preset threshold set by the drop in the RSENSE resistor 50. The transistor then turns off and the current continues to flow through the Schottky diode 11 into the LED 4. The sense resistor RM 40 senses the increasing LED current and when this is correct, the peak current threshold is reduced to keep the LED current correct.

A circuit embodying the invention and operating in "BOOST" mode is shown in FIG. 4. This is a configuration used where VIN is less than the LED voltage and so needs to be stepped up. It will be appreciated that this Boost configurations corresponds to the configuration of the circuit of FIG. 3 described above. The coil 3 is connected across VIN via a transistor and the current ramps up until it reaches a preset threshold set by the drop in the RSENSE resistor 50. The transistor then turns off and the current flows through the Schottky diode 11 into the LED 4. The sense resistor RM 40 senses the increasing LED current and when this is correct, the peak current threshold is reduced to keep the LED current correct.

"BUCK/BOOST" operation is where VIN can either be above or below the LED voltage and needs to be boosted when VIN is less than VLED, but also blocked when VIN is greater than LED. The circuit of FIG. 7 is configured to operate in this mode. This is achieved by connecting the cathode of the LED 4 to VIN instead of ground. As with the BOOST circuit, the coil 3 is connected across VIN via a transistor and the current ramps up until it reaches a preset threshold set by the drop in the RSENSE resistor 50. The transistor then turns off and the current flows via a Schottky diode 11 (which again, as in other embodiments, as shown in FIGS. 3, 4, 5 and 6, could be replaced by another rectifying device, such as a synchronous switch) into the LED 4. The sense resistor RM 40 senses the LED increasing current and when this is correct, the peak current threshold is reduced to keep the LED current correct. The VIN can be greater than the LED voltage and current will not flow in the LED, even in what is effectively a BOOST configuration, giving a wide range of possible VIN voltages.

"BOOTSTRAP" operation is where the supply is much less than the LED voltage and so needs to be stepped up. The circuit of FIG. 6 is arranged to operate in this mode. The operation is identical with BOOST operation, except that the chip 100 VIN pin is taken to the top of the LED 4 circuit. The coil is connected across the supply via a transistor and the current ramps up to one of two levels depending on VIN. If VIN is less than a certain voltage, the transistor is switched on and off at a fixed frequency, regardless of whether the value has reached the preset threshold or not. This gives some power to the output, even at very low input voltages. The LED voltage rises and when VIN exceeds a certain voltage, it reverts to the BOOST mode described above, where it reaches a preset threshold set by the drop in the RSENSE resistor. The transistor then turns off and the current flows through the Schottky diode 11 into the LED. The sense resistor RM 40 senses the increasing LED current and when this is correct, the peak current threshold is reduced to keep the LED current correct. The VIN voltage is now equal to the LED voltage, even though the system supply might only be 1 volt.

From the above description it will be appreciated that certain circuits embodying the invention differ from the prior art DC to DC converters in that the control method is changed from a skip mode (stop-start) to a current mode (continuous). The skip mode of the prior art could produce large ripple, with resultant electromagnetic radiation and the frequency of the skipping could be within the audio range, resulting in the coil core emitting an undesirable audible whistle.

In contrast, certain embodiments of the invention use a current monitor on the LED to produce a signal proportional to LED current and a circuit to generate a current proportional to brightness demand. These currents are used to control the power in the LED, using an integrating regulator. Thermal management is included, to de-rate the LED current progressively at high temperatures, avoiding thermal damage to the LED.

Thus, certain embodiments driving LEDs differ from the prior art in that they provide a brightness ADJUST pin feeding an integrating regulator to control the converter power progressively as desired, rather than a simple comparator which gives "stop-start" operation at either full power or zero power, and in that thermal management is provided.

Advantages of the embodiments of the invention include the following. The progressive control of the coil current, rather than the prior art "stop-start" method, results in the converter running continuously. This results in the operating frequency always being outside the audio range, preventing the coil core whistling. The reduced peak current at lower LED brightness settings reduces $I^2R$ losses. For battery-operated equipment, although the peak current will initially be high to establish the LED current, it then reduces and the circuit will be able to continue operation with a battery which is heavily discharged. In the prior art, the peak current is always maximum and, if it cannot be reached with a partly-discharged battery, the circuit will "stall". The thermal management also uses the same power control loop, giving progressive reduction of the LED current at higher temperature and preventing damage to the LED. A variable OFF time makes the power control more effective, enabling fixed external components to be used over a wider supply voltage range. Embodiments of the invention can be used for various applications. For example, embodiments may be used to drive LEDs from supplies of between 1 volt and 18 volts, for anything from single-cell torches to automotive use.

Certain embodiments may be used to drive a solid state LED with a constant current, despite varying supply voltage, LED temperature and PCB temperature, and can provide controlled dimming, e.g. from 10% to 100% of the programmed current Certain embodiments are able to work with a supply voltage which could be either lower or higher than the LED voltage. Prior art converters have used a 4 switch architecture, but this is very difficult to stabilise. Accordingly, in embodiments of the invention a topology is used where the LED cathode is returned to the VIN instead of ground. This means the circuit will work from VIN voltages less than the LED voltage, but the LED does not turn on uncontrollably for VIN voltages greater than the LED voltage, as with a conventional boost circuit.

Certain embodiments of the invention may be described as DC to DC converter circuits with an integrating controller, variable off time according to the programmed current and thermal compensation for the LED. The circuit compares the measured LED current with a programming pin that sets demand, which can be DC, or low frequency PWM in alternative embodiments. The error signal controls a PFM (pulse frequency modulation) controller to vary the peak current (and therefore the energy) stored in an external coil to attain the correct LED current. Benefits include: optimised efficiency over a wide input voltage range; auto current compensation for one or more LEDs (e.g. 1 to 4); no audible switching noise because of continuous mode of operation; inherent stability for any input voltage and LED current; can operate in Buck or Boost mode; and thermal management of LED current is provided, giving full power availability up to a preset operating temperature and linear de-rating above that to zero power at another, higher preset operating temperature.

As mentioned above, summing means (which may also be referred to as a summing circuit) suitable for use in the embodiment illustrated in FIG. 3, and indeed for use in the other embodiments described below, is shown in FIG. 8. This can also be described as a diagram of the power control summing node. Power control in the circuit of FIG. 3 (and in the circuits of FIGS. 4-7 is achieved by varying the threshold needed to trip a comparator. This comparator is monitoring the voltage across a low value current sense resistor and the value at which the comparator trips thus determines the peak current in the resistor and hence in the inductor being charged up. The way this is done when using the arrangement of FIG. 8 is by having two resistors. One is 5 kΩ and goes to the ISENSE pin. The other is 45 kΩ and goes to a buffered version of the voltage on the CFB pin. The CFB pin is designed to charge upwards when the LED current exceeds the demanded value and downwards when the LED current is less than the demanded value. A 500 mV reference is divided down by the 51 kΩ and 45 kΩ potential divider. This gives a ratio of 1:10, hence the voltage at the comparator negative input is 50 mV. The comparator always trips when its positive input exceeds the predetermined threshold voltage (in this example 50 mV). A similar network is connected between the ISENSE pin and the emitter of an emitter follower, the latter serving the purpose of a buffer for the CFB voltage. If there is no CFB voltage, the potential needed at the SENSE pin to obtain 50 mV at the comparator is actually 55.5 mV, as the emitter will be at zero volts and the network divides the ISENSE voltage by 45/50. If the emitter is at 500 mV, there will be 50 mV at the comparator even with zero voltage on the ISENSE pin, so no ISENSE voltage at all is needed to trip the comparator. The CFB pin can thus vary the ISENSE voltage that trips the comparator, and hence the peak coil current, from a specified maximum down to zero and this is how it controls the power. There is a VBE voltage, approximately 700 mV, between the CFB pin on the base of the emitter follower and the emitter, so the range of voltages required on the CFB pin is shifted up by 700 mV. Instead of the "end stops" being zero and 500 mV, they become 700 mV and 1200 mV. This means the CFB pin has no effect until it reaches approximately 700 mV, then the power is progressively reduced until it reaches zero when the CFB pin is at 1200 mV. The precise law between CFB voltage and power is not at all critical, as it is inside the overall feedback loop and it is actually the matching of the two transconductors which determines the overall accuracy of the system.

The invention claimed is:

1. A circuit comprising:
    a first supply rail and a second supply rail for connection to a dc power supply;
    an inductor;
    a load; and
    a controllable switching device, switchable between a conducting state and a non-conducting state, and a switching device current sensing resistor connected in series with the controllable switching device such that a voltage across the switching device current sensing resistor is indicative of a current flowing through the switching device,
    the inductor, load and controllable switching device being arranged in one of two configurations, the two configurations comprising:
    a first configuration in which, when the controllable switching device is in the conducting state, current is permitted to flow from the first supply rail to the second supply rail, through the inductor and controllable switching device, bypassing the load and energising the inductor, and when the controllable switching device is in the non-conducting state it blocks current flow through itself, current flows through the load, and the inductor discharges energy into the load; and
    a second configuration in which, when the controllable switching device is in the conducting state, current is permitted to flow from the first supply rail to the second supply rail through the load, inductor and controllable switching device in series, energising the inductor, and when the controllable switching device is in the non-conducting state it blocks current flow through itself, current flows through the load, and the inductor discharges energy into the load,
    and wherein the circuit further comprises:
    control means arranged to control the switching device to alternate between the conducting state and the non-conducting state,
    and characterised in that the circuit further comprises:
    a load current sensing resistor connected in series with the load such that a voltage across the load current sensing resistor is indicative of a current flowing through the load;

a demand signal input for receiving a demand signal indicative of a desired current through the load; and monitoring means arranged to monitor the demand signal, and the voltages across the sense resistors, and generate a monitor signal having a magnitude dependent upon the demand signal, the voltage across the switching device current sensing resistor and the voltage across the load current sensing resistor, wherein the control means is arranged to receive the monitor signal and to switch the switching device from the conducting state to the non-conducting state in response to the magnitude of the monitor signal exceeding a predetermined threshold, and wherein the control means is arranged to switch the switching device back to the conducting state a delay time after switching the switching device to the non-conducting state in response to the monitor signal, the delay time being determined according to the demand signal.

2. A circuit in accordance with claim 1, wherein the monitoring means is arranged such that the magnitude of the monitor signal increases in response to increasing current through the switching device.

3. A circuit in accordance with claim 1, wherein the monitoring means is arranged such that the magnitude of the monitor signal increases in response to load current exceeding the desired current.

4. A circuit in accordance with claim 1, wherein the monitoring means comprises a first current generator arranged to generate a demand current having a magnitude dependent upon the demand signal, the monitor signal magnitude being dependent upon the demand current.

5. A circuit in accordance with claim 4, wherein the demand signal is a voltage signal, and the first current generator is a first voltage-to-current converter arranged to generate the demand current with a magnitude proportional to the magnitude of the demand signal voltage.

6. A circuit in accordance with claim 4, wherein the monitoring means comprises a second voltage-to-current converter arranged to generate a load monitoring current having a magnitude proportional to the voltage across the load current sensing resistor, the monitor signal magnitude being dependent upon the load monitoring current.

7. A circuit in accordance with claim 6, wherein the monitoring means comprises integrating means arranged to generate a voltage dependent upon an integrated difference between the demand current and the load monitoring current.

8. A circuit in accordance with claim 6, wherein the monitoring means comprises a capacitor arranged to be charged by the load monitoring current and discharged by the demand current, the magnitude of the monitor signal being dependent upon a voltage across the capacitor.

9. A circuit in accordance with claim 8, wherein the monitoring means comprises summing means arranged to generate the monitor signal according to the magnitudes of the voltage across the switching device current sensing resistor and the voltage across the capacitor.

10. A circuit in accordance with claim 1, comprising temperature sensing means arranged to sense a temperature of the load and generate a temperature signal indicative of the temperature of the load, the monitoring means being arranged to monitor the temperature signal and to generate the monitor signal such that the monitor signal magnitude is dependent upon the temperature signal.

11. A circuit in accordance with claim 10, wherein the temperature signal is a voltage signal and the monitoring means comprises a third voltage-to-current converter arranged to generate a temperature monitoring current having a magnitude proportional to the magnitude of the temperature signal, the monitor signal magnitude being dependent upon the temperature monitoring current.

12. A circuit in accordance with claim 11, wherein the monitoring means comprises a first current generator arranged to generate a demand current having a magnitude dependent upon the demand signal, the monitor signal magnitude being dependent upon the demand current, wherein the monitoring means comprises a second voltage-to-current converter arranged to generate a load monitoring current having a magnitude proportional to the voltage across the load current sensing resistor, the monitor signal magnitude being dependent upon the load monitoring current, wherein the monitoring means comprises a capacitor arranged to be charged by the load monitoring current and discharged by the demand current, the magnitude of the monitor signal being dependent upon a voltage across the capacitor and wherein the temperature monitoring current is arranged to charge the capacitor.

13. A circuit in accordance with claim 12, wherein the temperature monitoring current and the load monitoring current are sourcing currents, and the demand current is a sinking current.

14. A circuit in accordance with claim 1, wherein the first supply rail is a positive supply rail for connecting to a positive terminal of a dc supply, the second supply rail is a ground rail, and the load current sensing resistor is arranged on the high side of the load, between the load and the positive supply rail.

15. A circuit in accordance with claim 14, wherein the switching device current sensing resistor is arranged on the low side of the switching device, between the switching device and the ground rail.

16. A circuit in accordance with claim 1, wherein the demand signal is a voltage signal having a magnitude indicative of the desired current, and the control means is arranged to increase the delay time in response to a decrease in the demand signal magnitude.

17. A circuit in accordance with claim 1, wherein the load comprises a light-emitting diode (LED).

18. A semiconductor chip package for incorporation in a circuit in accordance with claim 1, the semiconductor chip package comprising:
the control means;
the monitoring means;
pins for connection to the supply rails;
pins for receiving a differential voltage signal from across the load current sensing resistor;
a pin for connection to an external integrating capacitor;
a pin for receiving a voltage signal from a high side of the switching device current sensing resistor; and
a pin for receiving the demand signal.

19. A method of driving a current through a load, the method comprising:
providing a first supply rail and a second supply rail and a dc power supply connected between the first and second rails;
providing an inductor;
providing a load;
providing a controllable switching device, switchable between a conducting state and a non-conducting state, and a switching device current sensing resistor connected in series with the controllable switching device such that a voltage across the switching device current sensing resistor is indicative of a current flowing through the switching device;

arranging the inductor, load and controllable switching device in one of two configurations, the two configurations comprising:
a first configuration in which, when the controllable switching device is in the conducting state, current is permitted to flow from the first supply rail to the second supply rail, through the inductor and controllable switching device, bypassing the load and energising the inductor, and when the controllable switching device is in the non-conducting state it blocks current flow through itself, current flows through the load, and the inductor discharges energy into the load; and
a second configuration in which, when the controllable switching device is in the conducting state, current is permitted to flow from the first supply rail to the second supply rail through the load, inductor and controllable switching device in series, energising the inductor, and when the controllable switching device is in the non-conducting state it blocks current flow through itself, current flows through the load, and the inductor discharges energy into the load; and
controlling the switching device to alternate between the conducting state and the non-conducting state;
characterised in that the method further comprises:
providing a load current sensing resistor and connecting the load current sensing resistor in series with the load such that a voltage across the load current sensing resistor is indicative of a current flowing through the load;
providing a demand signal indicative of a desired current through the load;
monitoring the demand signal, and the voltages across the sense resistors;
using the demand signal, the voltage across the switching device current sensing resistor and the voltage across the load current sensing resistor to determine when to switch the switching device from the conducting to the non-conducting state; and
using the demand signal to determine a delay time interval between switching the switching device from the conducting state to the non-conducting state and switching the switching device back from the non-conducting state to the conducting state.

20. A method in accordance with claim 19, further comprising monitoring a temperature of the load, generating a temperature signal indicative of the load temperature, and using the temperature signal in addition to the demand signal, the voltage across the switching device current sensing resistor and the voltage across the load current sensing resistor to determine when to switch the switching device from the conducting to the non-conducting state.

21. A method in accordance with claim 19, further comprising generating a demand current having a magnitude dependent upon the demand signal, generating a load monitoring current having a magnitude proportional to the voltage across the load current sensing resistor, arranging a capacitor to be charged by the load monitoring current and discharged by the demand current, and using the voltage across the capacitor to determine when to switch the switching device from the conducting to the non-conducting state.

22. A method in accordance with claim 21, further comprising monitoring a temperature of the load, generating a temperature signal indicative of the load temperature, and using the temperature signal in addition to the demand signal, the voltage across the switching device current sensing resistor and the voltage across the load current sensing resistor to determine when to switch the switching device from the conducting to the non-conducting state, and further comprising generating a temperature monitoring current having a magnitude dependent upon the temperature signal, and arranging the capacitor to be charged by the temperature monitoring signal in addition to the load monitoring signal.

23. A method in accordance with claim 21, comprising generating a monitoring signal according to the magnitudes of the voltage across the switching device current sensing resistor and the voltage across the capacitor.

24. A method of driving a current through a load, the method comprising:
providing a first supply rail and a second supply rail and a dc power supply connected between the first and second rails;
providing an inductor;
providing a load;
providing a controllable switching device, switchable between a conducting state and a non-conducting state, and a switching device current sensing resistor connected in series with the controllable switching device such that a voltage across the switching device current sensing resistor is indicative of a current flowing through the switching device;
arranging the inductor, load and controllable switching device in one of two configurations, the two configurations comprising:
a first configuration in which, when the controllable switching device is in the conducting state, current is permitted to flow from the first supply rail to the second supply rail, through the inductor and controllable switching device, bypassing the load and energising the inductor, and when the controllable switching device is in the non-conducting state it blocks current flow through itself, current flows through the load, and the inductor discharges energy into the load; and
a second configuration in which, when the controllable switching device is in the conducting state, current is permitted to flow from the first supply rail to the second supply rail through the load, inductor and controllable switching device in series, energising the inductor, and when the controllable switching device is in the non-conducting state it blocks current flow through itself, current flows through the load, and the inductor discharges energy into the load; and
controlling the switching device to alternate between the conducting state and the non-conducting state,
characterised in that the method further comprises:
providing a demand signal indicative of a desired current through the load; and
using the demand signal to determine a length of time between switching the switching device from the conducting state to the non-conducting state and switching the switching device back from the non-conducting state to the conducting state.

25. A method in accordance with claim 24, further comprising the step of providing a load current sensing resistor and connecting the load current sensing resistor in series with the load such that a voltage across the load current sensing resistor is indicative of a current flowing through the load.

26. A circuit comprising:
a first supply rail and a second supply rail for connection to a dc power supply;
an inductor;
a load; and
a controllable switching device, switchable between a conducting state and a non-conducting state, and a switching device current sensing resistor connected in series with the controllable switching device such that a voltage across the switching device current sensing resistor is indicative of a current flowing through the switching device;

the inductor, load and controllable switching device being arranged in one of two configurations, the two configurations comprising:

a first configuration in which, when the controllable switching device is in the conducting state, current is permitted to flow from the first supply rail to the second supply rail, through the inductor and controllable switching device, bypassing the load and energising the inductor, and when the controllable switching device is in the non-conducting state it blocks current flow through itself, current flows through the load, and the inductor discharges energy into the load; and a second configuration in which, when the controllable switching device is in the conducting state, current is permitted to flow from the first supply rail to the second supply rail through the load, inductor and controllable switching device in series, energising the inductor, and when the controllable switching device is in the non-conducting state it blocks current flow through itself, current flows through the load, and the inductor discharges energy into the load, and wherein the circuit further comprises:

control means arranged to control the switching device to alternate between the conducting state and the non-conducting state, characterised in that the circuit further comprises:

a demand signal input for receiving a demand signal indicative of a desired current through the load, and in that the control means is arranged to switch the switching device back to the conducting state a delay time after switching the switching device to the non-conducting state, wherein the control means is arranged to determine the delay time according to the demand signal.

27. A circuit in accordance with claim 26, further comprising a load current sensing resistor connected in series with the load such that a voltage across the load current sensing resistor is indicative of a current flowing through the load.

* * * * *